Saml. Page
Hay-Elevator.
No. 75452 Fig. 1
PATENTED
MAR 10 1868
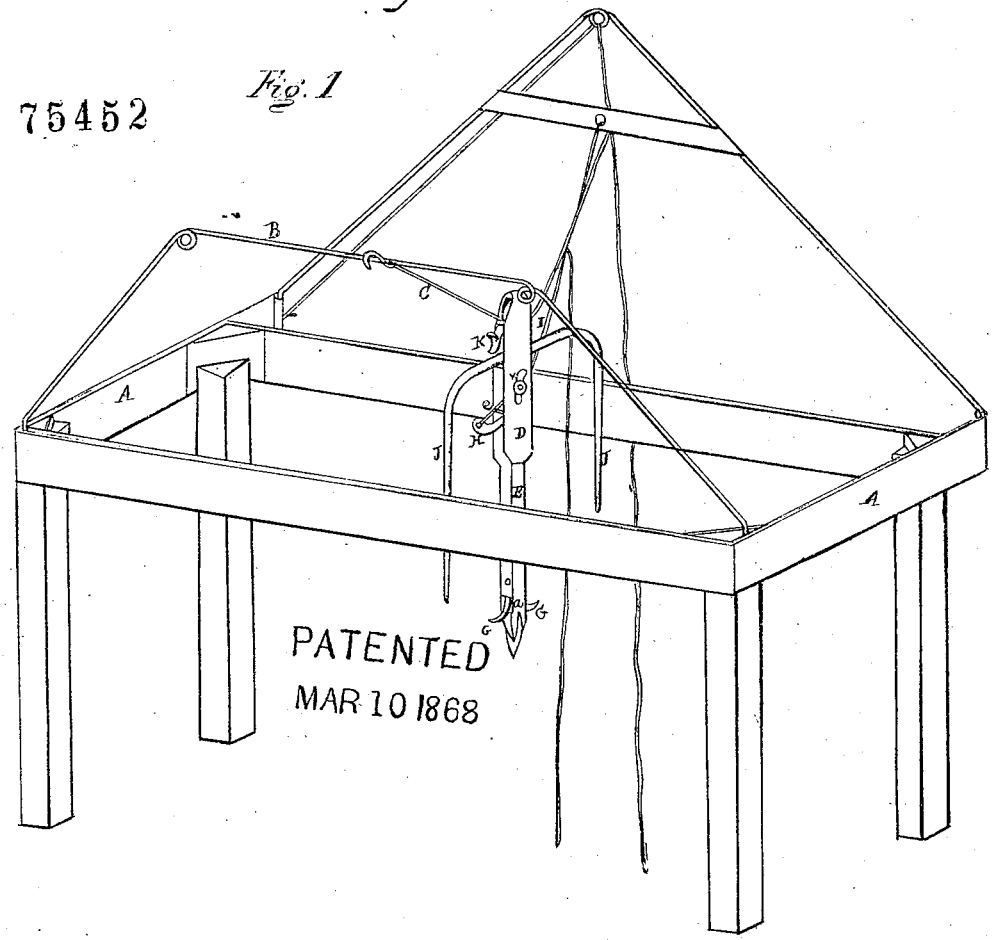
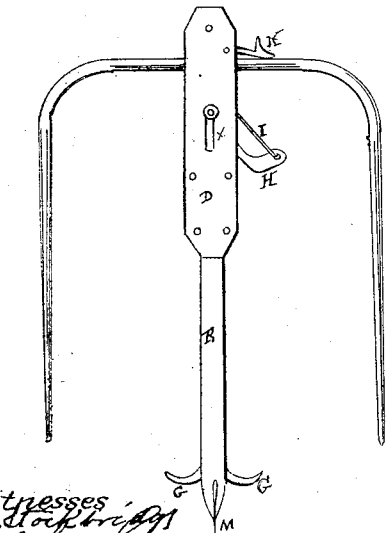
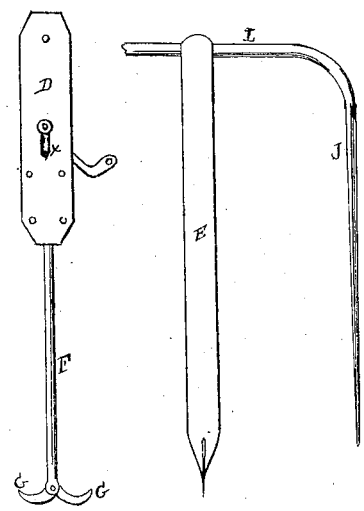
Witnesses
Inventor
Saml. Page

United States Patent Office.

SAMUEL PAGE, OF McALISTERVILLE, PENNSYLVANIA.

Letters Patent No. 75,452, dated March 10, 1868.

IMPROVEMENT IN HORSE HAY-FORKS.

*The Schedule referred to in these Letters Patent and making part of the same.*

TO ALL WHOM IT MAY CONCERN:

Be it known that I, SAMUEL PAGE, of McAlisterville, in the county of Juniata, and in the State of Pennsylvania, have invented certain new and useful Improvements in Horse Hay-Forks; and do hereby declare that the following is a full, clear, and exact description thereof, reference being had to the accompanying drawings, and to the letters of reference marked thereon.

In the annexed drawings, making part of this specification, A represents the frame of a hay-mow, provided with suitable rafters, near the tops of which are secured pulleys or made holes, through which a cord or rope is passed, upon which is suspended the hay-fork. C represents this rope or cord, which is made fast at one end, while the other end is loose or free to work in raising and lowering the fork. To construct my fork I use first a sufficiently heavy strap or metal, D, which is bent double at its middle, its two ends being placed even, a short distance apart, and its sides parallel. In each side of this strap is formed a slot, $x$, which is made longitudinally of it, and at the upper end of which is a little jog or offset, as seen in Figure 1. Between the two sides, near their upper ends, or where the strap is doubled, is pivoted a pulley, $d$, and between them, near their lower ends, is secured the upper end of a metallic bar, F. This bar F has pivoted to its lower end two hooks, G G. E represents a sliding frame, which is composed of two metal bars, which are placed a suitable distance apart, and secured in that position. This frame is placed between the sides of the strap D, and a pivot passes through it and through the slots $x\ x$ in the strap, allowing said frame to move the length of said slots $x\ x$. To the lower end of this frame is secured a knife, M, which is in the shape of an arrow-head, and to its upper end is secured a cross-bar, J, which has two tines secured to it at its outer ends. These tines project downward, as represented. The rod F lies between the sides of the frame E, and its hooks G G work through openings $a$, in or near the lower end of said frame. When the frame E is raised or lowered, the openings $a$ cause the hooks to draw into said frame, or stand out at right angles to it. H represents a lever, which is pivoted at one end, between the sides of the frame E, near its upper end. This lever, by bearing against a cross-pin, $e$, passing through strap D, causes the frame E to descend after it has been raised, thus drawing the hooks G G within said frame for discharging the hay. A cord, I, is secured to the outer end of this lever, by means of which it is operated. K represents a stop, which is pivoted between the sides of the strap D, and which drops upon the cross-bar L, to keep it in position when desired.

In using this fork, the cord C is passed under the pulley $d$, so as to suspend it in the mow. The frame E is drawn up so that the hooks are within it, and so that the sharp end at knife M can enter the hay. This sharp end is thrust into the hay as deep as required, and then, by starting the frame downwards, the hooks G catch into the hay. When the operator commences to draw the cord C and raise the fork with its load, the weight upon frame E causes it to descend as low as possible, thus throwing out its hooks to their full extent. The tines J J keep the hay more securely upon the fork. After the hay has been raised as high as it is required, and is in its proper place, the lever H is operated by cord I, so that it throws the pivot which passes through slots $x\ x$ out of the jog or notch in the upper end of said slot, and allows the frame E to descend so as to draw in the hooks G from the hay, and thus free it. The fork is then ready for another load of hay.

Having thus fully described my invention, what I claim as new, and desire to secure by Letters Patent, is—

The strap D, provided with slots $x\ x$, in the upper ends of which is a jog or offset, the rod or bar F, and its hooks G G, the frame E, tines J J, and lever H, with its cord, the several parts being constructed, used, and operating in the manner and for the purpose set forth.

In testimony that I claim the foregoing, I have hereunto set my hand, this 31st day of December, 1867.

SAMUEL PAGE.

Witnesses:
   J. R. VANHORN,
   WILLIAM DUNN.